United States Patent [19]

Thompson

[11] 4,126,339
[45] Nov. 21, 1978

[54] PLAIN END PIPE FITTING

[75] Inventor: Ernest R. Thompson, Pittsburg, Kans.

[73] Assignee: W. S. Dickey Clay Mfg. Co., Pittsburg, Kans.

[21] Appl. No.: 853,118

[22] Filed: Nov. 21, 1977

[51] Int. Cl.² .............................................. F16L 21/02
[52] U.S. Cl. .................................... 285/369; 285/379; 285/383; 285/423
[58] Field of Search ............... 285/369, 383, 423, 235, 285/379

[56] References Cited

U.S. PATENT DOCUMENTS

| | | | |
|---|---|---|---|
| 2,890,899 | 6/1959 | Simmons et al. | 285/235 X |
| 3,212,799 | 10/1965 | Rice | 285/235 |
| 3,368,830 | 2/1968 | French | 285/235 X |
| 3,394,952 | 7/1968 | Garrett | 285/383 X |
| 3,695,643 | 10/1972 | Schmunk | 285/423 X |
| 3,700,266 | 10/1972 | Glehn | 285/383 X |
| 3,785,682 | 1/1974 | Schaller | 285/423 X |

*Primary Examiner*—Dave W. Arola
*Attorney, Agent, or Firm*—Fishburn, Gold & Litman

[57] ABSTRACT

A fitting for forming a sealed joint with a plain end portion of pipe includes a semi-elastic sleeve member having enlarged ends with annular sealing gaskets received therein. An inwardly extended ridge member is circumferentially arranged at the longitudinal midportion of the sleeve member and provides an abutment surface for limiting the inward extension of a pipe end. A plurality of circumferentially spaced rib-shaped protuberances are positioned within the sleeve member and extend radially inwardly from the interior surface for compressibly gripping and supportably engaging the pipe end within the sleeve member.

6 Claims, 5 Drawing Figures

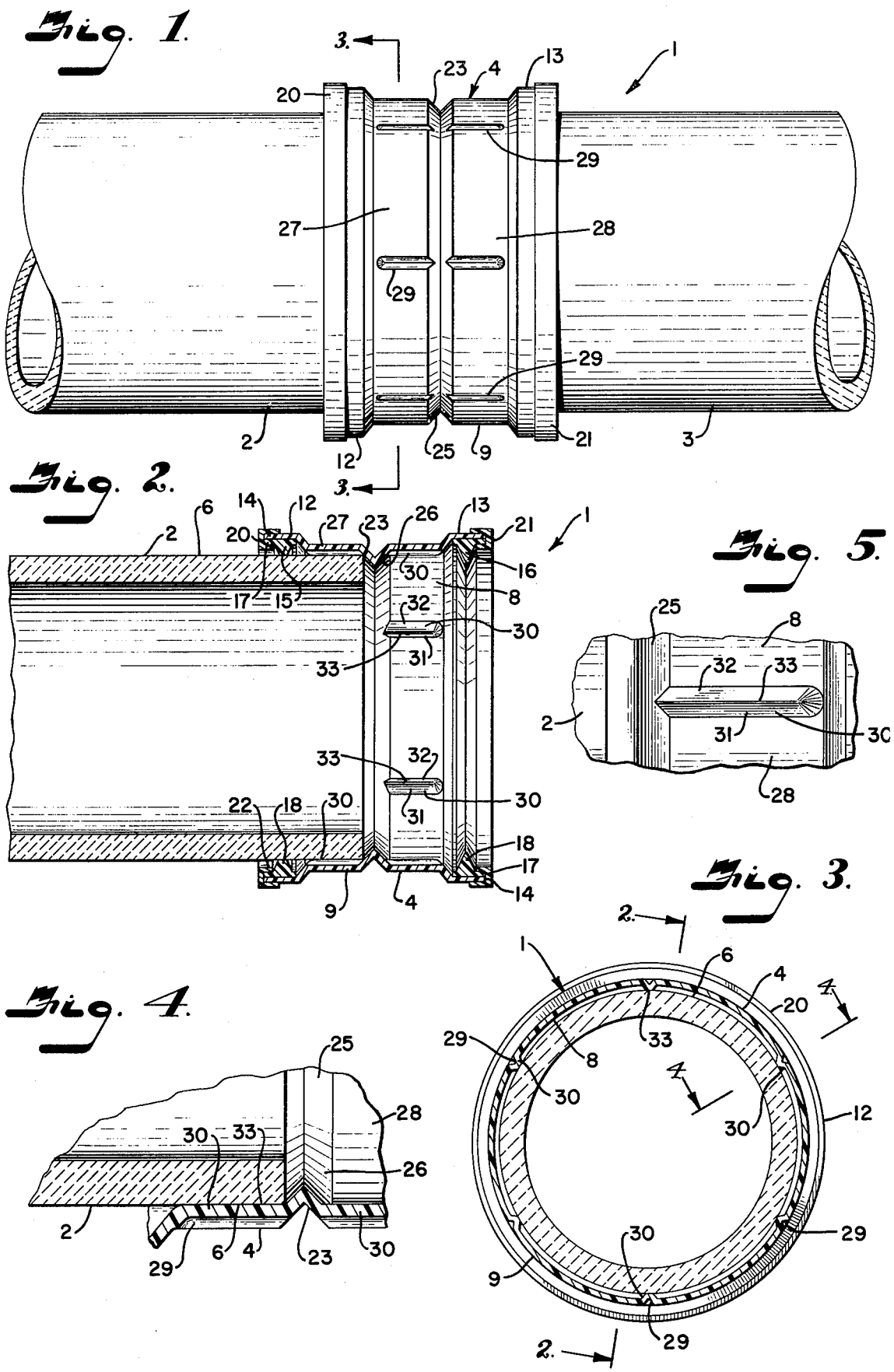

PLAIN END PIPE FITTING

Pipe sections joined together to form a line or run of pipe for flow of fluids therethrough must be free from leakage and, accordingly, considerable care must be employed in selecting a fitting which will properly form joints between adjacent sections of pipe and which will securely grip and maintain the pipe in a proper, leak-free relationship. Some fitting designs do not allow attachment at the factory and must be shipped separately. Frequently, plain end pipes deviate from perfect roundness, and have variations in circumferential dimensions which will not allow a fitting with a fixed internal dimension to grip the plain end pipe.

In an effort to alleviate the above problems, plain end pipe fittings have been manufactured of various resilient materials, including vinyl, formed to shape, and having relatively elastomeric ring gasket seals at opposite ends of a tubular structure. Typically, these structures attempt to both secure the pipe from outward movement and seal the same from leakage by means of the soft ring gasket. These structures generally perform satisfactorily when properly installed. However, some fitting designs generally offer little or no resistance to pulling free or cocking. Moreover, shifting of the pipe commonly causes the pipe surface and the gasket seal to become separated, an obviously weak arrangement leading to possible leakage from the fitting.

The present invention relates to fittings for use with plain end pipes of ceramic, clayware, pitch-fiber, or asbestos-cement manufacture, such as are used for sewers, drain, cable conduit and the like.

The principal objects of the invention are: to provide a plain end pipe fitting formed of a material inert to soil materials and organism for connection to an end of a section of plain end pipe; to provide a plain end pipe coupling having such a structure adapted to connect two pipe sections in end-to-end relation and which permits said coupling to be connected to one pipe section end at a factory and shipped to a site from connection to another pipe section; to provide such a plain end pipe fitting having a gasket member for sealing engagement with a plain end pipe with means limiting the instrusion of a plain end pipe and a plurality of circumferentially spaced, inwardly extending protuberances supportably gripping a plain end pipe; to provide such a plain end pipe fitting including a sleeve member having supporting means retaining a section of plain end pipe and having sealing means preventing same from leakage; to provide a plain end pipe fitting which sealably engages adjacent pipe sections for an infiltration-free joint when used in water and sewer conduit construction; to provide a plain end pipe fitting having a sleeve member formed of semi-elastic material which is insertably engageable with and accepts a pipe end which deviates slightly from a perfectly round shape; and to provide such a plain end fitting which is inexpensive to manufacture and install, durable in use, simple to install, has a preformed joint member having a sleeve portion ready to receive a pipe end, and is particularly well adapted for the proposed use.

Other objects and advantages of this invention will become apparent from the following description taken in connection with the accompanying drawings wherein are set forth, by way of illustration and example, a certain embodiment of this invention.

FIG. 1 is an elevational view of a plain end pipe fitting connecting a pair of plain end pipes in end-to-end relationship and embodying features of the present invention.

FIG. 2 is a fragmentary view of a plain end pipe fitting taken along lines 2—2, FIG. 3, and including a plain end pipe joined thereto and showing certain details thereof.

FIG. 3 is a fragmentary view of the plain end pipe fitting taken along lines 3—3, FIG. 1 and illustrating certain features thereof.

FIG. 4 is an enlarged, fragmentary view of the plain end pipe fitting taken along lines 4—4, FIG. 3, and showing the gripping engagement means between the fitting and a plain end pipe.

FIG. 5 is an enlarged, fragmentary view of certain features of the plain end pipe fitting.

Referring more in detail to the drawings:

As required, detailed embodiments of the invention are disclosed herein, however, it is to be understood that these embodiments are merely exemplary of the invention which may be embodied in many forms that are different from the illustrative embodiments presented herein. Therefore, specific structural and functional details disclosed herein are not to be interpreted as limiting but merely as a basis for the claims actually defining the scope of this invention. In this regard, it is to be recognized that pipe fittings, such as couplings, Tees, caps, and the like, for receiving an end portion of a plain end pipe to be fitted in accordance herewith, may be embodied in various forms, and this disclosure is presented only as a represented basis for teaching one skilled in the art to variously employ the present invention in virtually any appropriate detailed structure.

The reference numeral 1 generally designates a plain end pipe fitting embodying the present invention and connecting a pair of adjacent ends of plain end pipe sections 2 and 3 together in substantially end-to-end abutment. In the illustrated example, the predominent structural element of the fitting 1 is a sleeve member 4 formed of substantially rigid yet semi-elastic material and sized to receive adjacent facing pipe ends 2 and 3.

The plain end pipe fitting 1 includes features, described in detail hereinbelow, for effecting a secure supporting grip and a leak-free seal with at least one pipe end. In the illustrated example, the fitting 1 is in the form of a coupling for connecting aligned pipe sections although it is within the concept of this invention to employ the fitting 1 in combination with other conduit fitting forms, such as Tees, caps, angles, and the like. The fitting 1 will remain fluid-tight even when a line of pipe deflects during backfilling or settling and normal ground movements to thereby resist leakage from both within and outside the pipe.

The pipe ends 2 and 3 are each spigot or plain ends; that is, they have the same diameter as the body of the pipe and have no bells or enlarged ends or other special connecting portions. The fitting 1 is employed in connection with plain end pipes of ceramic, clayware, pitch-fiber, asbestos-cement, iron or the like. The sleeve portion 4 is commensurately sized to receive the pipe end therein. For example, ceramic pipe is typically manufactured in sizes ranging from 4 inches in diameter, progressing in 2 inch increments, to 12 inches in diameter and in 3 inch increments from 12 inches to 42 inches in diameter and the sleeve portion 4 must be correspondingly sized. Although generally cylindrical, some pipe ends may become slightly out of round during manufacture, and particularly during firing operations in the example of ceramic pipes, making effective joining and sealing difficult if not impossible with some plain end fittings. In contrast, the illustrated fitting 1 grips pipe slightly deviating from round and can be transported and handled without the fitting coming off the end of the pipe.

In the illustrated embodiment, sleeve member 4 is elongated generally cylindrical and has an interior surface 8 and an exterior surface 9.

The sleeve member 4 has enlarged end portions 12 and 13 receiving annular sealing members or gaskets 15 and 16 therein which interferingly engage with the pipe sections 2 and 3 and compressibly seal thereon for a tight, leak-free fit.

In cross section, FIG. 2, the gaskets 15 and 16 are preferably Vee-shaped, although other gasket cross sectional shapes, such as squares, O-rings, or the like may be used in applicable situations. The Vee-shape is preferred for the illustrated application because it includes an inwardly extended bead 18 which compresses in an interference engagement with the outer surface 6 of the pipe ends 2 and 3 to form a fluid-tight seal. Additionally, the bead 18 permits shifting of the pipe ends 2 and 3 relative to the sleeve member 4 also without allowing leakage. The gasket members are held in annular grooves or the like in the sleeve ends. In the illustrated structure, the gaskets 15 and 16 are respectively retained in the enlarged end portions 12 and 13 by end caps 20 and 21. In the present example, the end caps 20 and 21 are U-shaped annular rings having a pair of spaced and parallel wall members 22 forming an opening and inserted over the free end 14 of the respective enlarged end portion 12 or 13 and a projecting portion 17 of the respective gasket 15 or 16. The end caps 20 and 21 are secured to the free ends 14 by suitable engagement means, such as engagement lugs (not shown) providing a snap-on fit, gluing by suitable cements or solvents, or, in the illustrated example, by spin or heat welding.

The sleeve member 4 includes an inwardly extending ridge member 25, illustrated as an annular, Vee-shaped member protruding from the approximate longitudinal midportion 23 of the sleeve member. In the illustrated example, the ridge member 25 divides the sleeve member 4 into a pair of substantially cylindrical sections 27 and 28. However, it is to be noted that it is not necessary in the concept of the present invention for the sleeve member 4 to be comprised of two sections 27 and 28 but instead may be formed with only one or even three or four sections depending upon the function desired of the fitting 1. The ridge member 25 is preferably integrally formed with the sleeve member 4 and provides an abutment surface 26 for resistably limiting the extent of intrusion of the pipe end 2 or 3. Accordingly, in the present example, the ridge member 25 is interposed between the pipe ends 2 and 3 and prevents the same from possibly damaging contact with each other.

Positioned between the ridge member 25 and the enlarged end portion 12 and 13 and, as illustrated, within the respective sections 27 and 28 are a plurality of protuberances extended radially inwardly from the interior surface 8. The protuberances may be of a variety of suitable shapes, such as knobs, spines, or the like and in the illustrated example are shaped as ribs 30, although it is to be understood that various shaped protuberances may be employed commensurately with pipes having various surface textures and comprised of various materials.

As illustrated, the ribs 30 are each comprised of a pair of inwardly canted and converging surfaces or sides 31 and 32 which extend radially from the interior surface 8. The sides 31 and 32 join at an elongated apex line 33, thereby forming Vee-shaped member protruding from and substantially parallel to the axis of the bore of the sleeve member 4. Opposite the ribs 30, the exterior surface 9 has a like plurality of commensurately shaped depressions 29, illustrating for example a particular method of forming the ribs 30, as by molding or compression of moldable material.

It is to be noted that the ribs 30 can be variously oriented to the interior surface 8 and remain within the concept of this invention. Specifically, in some circumstances, it may be preferable to orient the ribs 30 helically or annularly to the sleeve member 4. In the illustrated example, the ribs 30 are preferably longitudinally or axially oriented and circumferentially spaced around the interior surface 8, forming an hexagonal arrangement. Preferably formed integrally with the sleeve member 4, the ribs 30 are likewise comprised of a rigid yet semi-elastic material which securely compressibly grips and supportably engages the pipe end 2 or 3.

The protrusions or ribs 30 are sized whereby the inner surfaces are spaced radially outwardly from the axis slightly less than the radium of the outer surface of the pipe end to be received therein. In engagement of the pipe end 2 with the fitting 1 as illustrated in FIGS. 3 and 4, the interior surface 8 is separated from the surface of the pipe end 2, so the engagement of the pipe end is by the gripping action of the ribs 20 which tend to prevent cooking of the fitting 1 on the pipe end 2. The semi-elastic material of the ribs 30 provides resistable engagement against the surface of the pipe end 2, thereby effecting frictional engagement therewith. The plurality of frictionally engaging ribs 30 arranged circumferentially around the interior of the sleeve member 4 effects supporting engagement and thereby gripping alignment of the fitting 1 relative to the pipe end 2. So supported in alignment, the pipe end 2 does not tend to become cocked or skewed or separated from the gasket seal 15, thereby preventing leakage from the fitting 1.

To effect the proper gripping engagement, it is preferred that the sleeve member 4 be formed of a substantially rigid yet semi-elastic material having sufficient flexibility to permit nominal angular movement of the pipe ends 2 and 3 transverse to the respective axis thereof and bending of the sleeve member 4. A desirable modulus of elasticity for proper flexibility is in the range of 50,000 to 2,000,000 pounds per square inch and a desired tensile strength for proper rigidity is in the range of 3,000 to 8,000 pounds per square inch. Therefore, the sleeve member 4 is formed of a suitable metallic material or a thermosetting or thermoplastic synthetic resinous material, such as polypropylene, polystyrene, polyvinyl chloride or acrylonitrile-butadiene-styrene (commonly referred to as (ABS). Polyvinyl chloride, for example, provides the desired rigidity combined with sufficient tensile strength and flexibility to support the pipe ends 2 and 3 and permit relative movement between the pipe ends 2 and 3 and the sleeve member 4 all without exceeding the strength of said sleeve member. A desirable thickness for a sleeve member 4 having the above strength requirements to make a joint between pipe sections having an eight inch nominal interior diameter is approximately one-eighth to one-fourth inch.

It is to be noted that, when formed of suitable semi-elastic materials, the sleeve member 4 resiliently stretches slightly to accept pipe sections which are slightly out of round. For example, when polyvinyl chloride (PVC) comprises the forming material, the sleeve member 4, sized to have an 8 inch nominal interior diameter, will flex up to one-half inch to accept a pipe not perfectly round. In general, the circumference of the pipe end 2 may deviate approximately ±1% (or 2% of the mean) from average circumference and the plain end pipe fitting 1 will maintain joint integrity and leakage-free seal.

Correspondingly, to effect the proper sealing engagement, it is desired that the gaskets 15 and 16 be formed of a suitable resilient, compressible material having only a very slight change in hardness and dimensional stability over a wide temperature range and thereby avoiding brittleness cracking.

It is preferred that the material of the gaskets 15 and 16 having a low compression set without cold flow under pressure; good seal to the pipe sections 2 and 3 under repeated temperature cycles; excellent resistance to acids, alkalis, solvents, sewer gas, micro-organisms and root penetration; and resistance to leakage from both within and outside the fitting 1. It is, therefore, preferred that the gaskets 15 and 16 of the plain end pipe fitting 1 be formed of a suitable resilient elastomeric material with a Shore A durometer value of 35 to 80 and particularly good seal to the pipe sections in spite of repeated temperature cycles varying over a wide range.

Connecting the illustrated plain end pipe fitting 1 with the pipe ends 2 and 3 is extremely fast and simple and requires only cleaning of the exposed surfaces, frictionally inserting one of the pipe sections into the sleeve portion 4, as for example, pipe end 2, until the respective end thereof seats against the ridge member 23 and then frictionally inserting the other pipe sections pipe end 3 in the other end of the sleeve member 4 and into abutting engagement with the ridge member 23. With this completed, the pipe ends 2 and 3 are sealingly connected or coupled and only the plastic portions of the plain end pipe fitting 1 and the pipes are exposed to the action of earth elements and the like.

The plain end pipe fitting 1 can be installed or coupled onto the pipe either at the pipe manufacturing plant or in the field. When installed at the manufacturing site, the plain end pipe fitting 1 is shipped in combination with the pipe without any substantial tendency to become lost or separated during transit. The ribs 30 retain the sleeve member 4 centered on the pipe section and prevent cocking or misalignment during shipment and handling, thereby reducing the need for field adjustment prior to further fitting operations.

It is to be understood that while certain forms of this invention have been illustrated and described, it is not to be limited to the specific forms or arrangement of parts herein described and shown, except insofar as such limitations are included in the following claims.

What is claimed and desired to secure by Letters Patent is:

1. A coupling for use with adjacent pipe plain ends for forming a joint comprising:
   (a) a tubular coupling of semi-elastic synthetic resin material and having two generally cylindrical sleeve sections joined by an inwardly extending integral annular rib which divides said sleeve sections, said sleeve sections each having an inner portion adjacent said annular rib and an enlarged portion spaced outwardly thereof and terminating in an open end, said sleeve inner portions adjacent the annular rib having an inner surface of a size to receive a pipe end portion therein;
   (b) each of said sleeve section inner portions having a plurality of circumferentially spaced inwardly extending integral ribs formed therein and extending longitudinally and having inner edges defining a diametrical spacing less than outside diameters of pipe ends received in said sleeve inner portions to grip said pipe end portions and support same, said sleeve inner portions being formable to accommodate outward forces applied to said circumferentially spaced ribs as pipe end portions are received therein; and
   (c) annular resilient gasket members in said enlarged sleeve portions and each forming a radially inner bead for interferably engaging a pipe end portion with a compressive force and forming a liquid seal between the pipe end portion and coupling.

2. A coupling as set forth in claim 1 wherein:
   (a) said circumferentially spaced ribs extend from adjacent the annular rib to adjacent the respective enlarged sleeve portion;
   (b) said annular gasket members are in the enlarged sleeve portions adjacent said sleeve inner portions; and
   (c) means on the enlarged sleeve portions retain the annular gaskets therein.

3. The coupling as set forth in claim 1 wherein:
   (a) said circumferentially spaced ribs are Vee-shaped in cross section and have inwardly converging side portions extended from said sleeve section inner portion and forming an apex line at the juncture of said side portions.

4. The coupling as set forth in claim 1 wherein:
   (a) said tubular coupling is semi-elastically stretchable to accept said pipe and accommodate pipe which deviates from round; and
   (b) said semi-elastic material is a thermoplastic synthetic resinous material having a modulus of elasticity in the range of 50,000 to 2,000,000 pounds per square inch and a tensile strength in the range of 3,000 to 8,000 pounds per square inch.

5. A pipe joint comprising:
   (a) a tubular coupling comprising a generally cylindrical sleeve of semi-elastic synthetic resin material;
   (b) an internally extending integral annular rib dividing the coupling into two generally cylindrical sections each of which has an inner portion adjacent to said annular rib and extending longitudinally therefrom and terminating in an enlarged portion which extends to a respective open end of the coupling;
   (c) pipes each having a plain end received within a respective coupling section with each pipe end adjacent said annular rib;
   (d) each of said coupling section inner portions having a plurality of circumferentially spaced inwardly extending integral ribs formed therein and extending longitudinally and having inner edges defining a diametrical spacing less than an outside diameter of said pipe ends received in the respective coupling section inner portion to grip said pipe and support same, said section inner portions being formable and accommodating outward forces to said circumferentially spaced ribs as said pipe ends are received therein; and (e) annular resilient gasket members in said enlarged portions of the coupling sections and each having a radially inner bead interferably engaging a respective pipe end with a compressive force forming a liquid seal between the pipe and coupling.

6. A pipe joint as set forth in claim 1 wherein:

(a) said circumferentially spaced ribs extend from adjacent said annular rib to adjacent the enlarged portion of the respective coupling section and said spaced ribs are Vee-shaped in cross-section and have inwardly converging sides forming said inner edge at the juncture of said sides;

(b) said tubular coupling is semi-elastically stretchable to accept said pipe ends and accommodate pipe ends which deviate from round; and (c) means secured on said enlarged portions of the coupling sections and engaging the respective resilient annular gasket means to retain same in said enlarged portions of the coupling sections.

* * * * *